United States Patent [19]
Hennemann et al.
[11] 4,066,922
[45] Jan. 3, 1978

[54] ELECTRICAL MOTOR-CONTROL DEVICE FOR ELECTRICAL EQUIPMENT

[75] Inventors: Jean Hennemann, Hombliers; Bernard Daussin, St. Quentin, both of France

[73] Assignee: Unelec S.A., Paris Cedex, France

[21] Appl. No.: 707,665

[22] Filed: July 22, 1976

[30] Foreign Application Priority Data

| | | |
|---|---|---|
| July 28, 1975 | France | 75.23524 |
| Apr. 14, 1976 | France | 76.10973 |

[51] Int. Cl.$^2$ .......... H02K 7/06
[52] U.S. Cl. .......... 310/80; 310/78; 310/83; 335/69
[58] Field of Search .......... 335/69; 310/80, 83, 310/78, 75 R

[56] References Cited

U.S. PATENT DOCUMENTS

| | | | |
|---|---|---|---|
| 3,171,920 | 3/1965 | Klein et al. | 335/69 |
| 3,296,565 | 1/1967 | Kiesel et al. | 335/69 |
| 3,819,966 | 6/1974 | Noguchi | 310/78 X |

*Primary Examiner*—Donovan F. Duggan
*Attorney, Agent, or Firm*—Haseltine, Lake & Waters

[57] ABSTRACT

Electrical motor-control device for electrical equipment comprising a drive mechanism including an electric motor and a movement transformation mechanism including an endless screw on which is installed a linearly displaceable nut connected with slight play to an operating member of the electrical equipment. A torque limiter is inserted between the drive mechanism and the movement transformation mechanism. The torque limiter comprises a disk made of rough material integral with a worm screw and has component parts in the form of segments of a ring connected by springs clamping the said disk made of friction material. Applications: remote control of electric circuit-breakers.

4 Claims, 10 Drawing Figures

ELECTRICAL MOTOR-CONTROL DEVICE FOR ELECTRICAL EQUIPMENT

FIELD OF THE INVENTION

The present invention relates to an electrical motor-control device for electrical equipment and more particularly to a device for transforming the rotary movement of an electric motor into an alternating movement of an operating member for changing a circuit-breaker from its open position to its closed position or vice-versa.

DESCRIPTION OF THE PRIOR ART

Mechanisms of this kind are known in which a worm screw actuated by a motor has a nut movable along the worm screw without turning, and trapping an operating member which is to be moved longitudinally. The aim of this kind of device is the remote control of members which cannot be reached by hand. Nevertheless, the device requires means which allows extra rotation of the motor when the operating member abuts either end of its travel, because once the electric motor is started, it does not stop immediately. For this purpose, there have already been proposed various tripping devices or flexible connections enabling an over-run of the motor.

These former devices have the disadvantage of being complicated, expensive and bulky, or of requiring very precise previous positioning of the various members.

The present invention provides an electric motor-control device for electrical equipment comprising a drive mechanism including an electric motor connected via a torque limiter to drive a movement transformation mechanism. The movement transformation mechanism includes a worm screw on which is installed a nut unit which is movable along the worm screw and is connectable to the operating member of the electrical equipment to be controlled.

Preferably the torque limiter comprises a connection between two rotating members, one of which is connected to the drive mechanism and the other of which is connected to the movement transformation mechanism. The connection is operable to exert, between these two rotating members, a variable and limited force determined by the real relative angular position of the members.

The torque limited device may be implemented by an accentric cam rotating with the worm screw and with a drive member bearing against the cam and sping-mounted on a driven gear of the drive mechanism, the gear rotating freely about the axis common to the cam and to the worm screw.

Alternatively, the torque limiter may comprise a friction connection between two rotating assemblies, one of which is connected to the drive mechanism and the other of which is connected to the movement transformation mechanism. The connection operates to exert, between the two rotating assemblies, a frictional force decreasing as a function of the angular speed of the assembly connected to the drive mechanism.

Preferably the nut unit drives an auxiliary mechanism determining both the position of an end-of-stroke reversible switch inserted in the electricity supply circuit of the motor and the position of the mechanical member for indicating the position of the control device.

The auxiliary mechanism may comprise a slidable member which can be moved in a linear movement parallel to the nut unit and has two stops against which the nut unit bears, the one during the movement in one direction and the other during the movement in the other direction. The slidable member operates to actuate a control member for controlling the end-of-stroke reversible switch and a mechanical position indicating member.

Preferably the movement transformation mechanism has a folding handle for manual operation of the control device.

DETAILED DESCRIPTION

Figure 1:
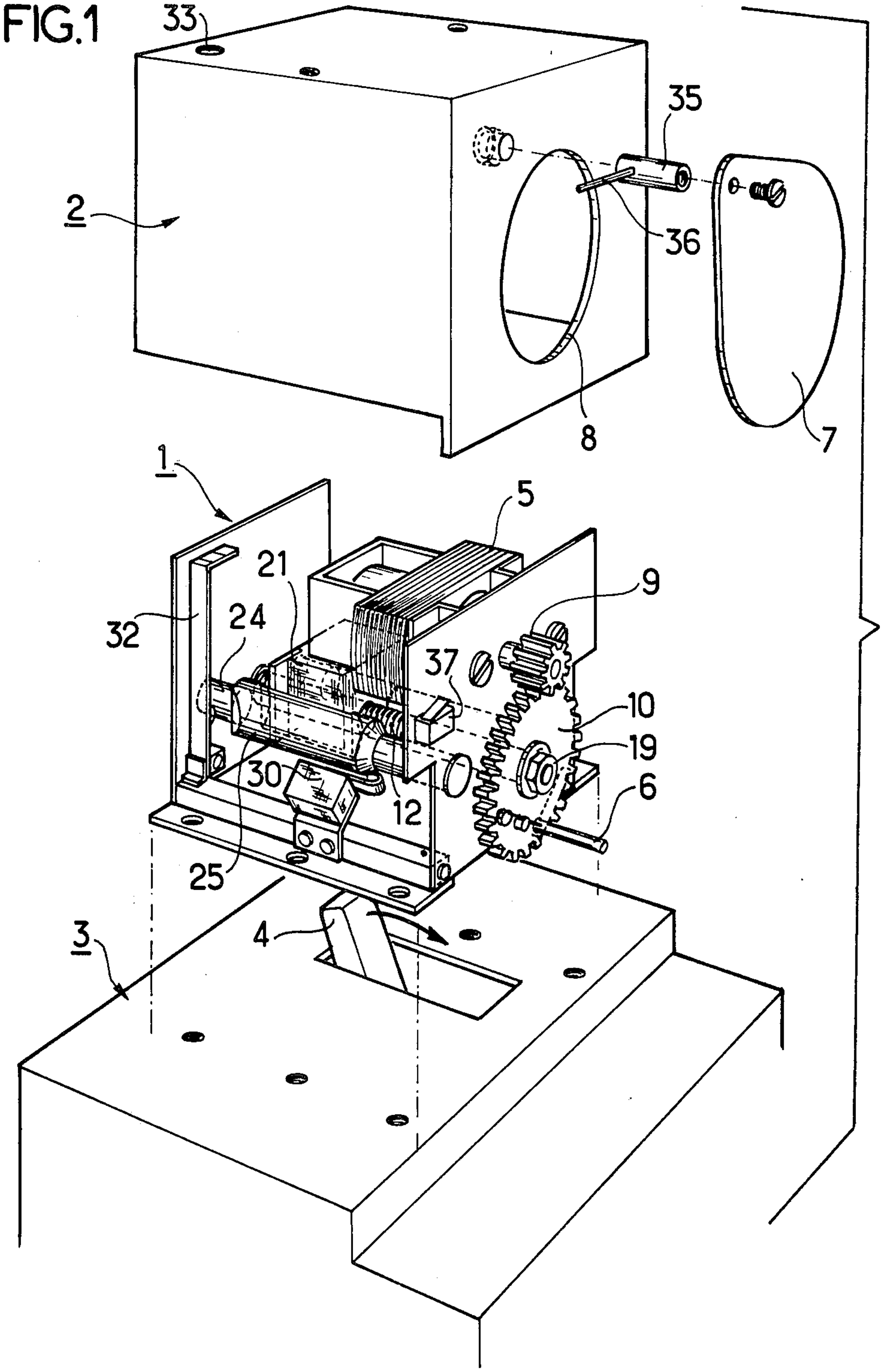
FIG. 1 is a perspective exploded view of an electrical control device and of the top of the electrical equipment which it is to control.
Figure 2:
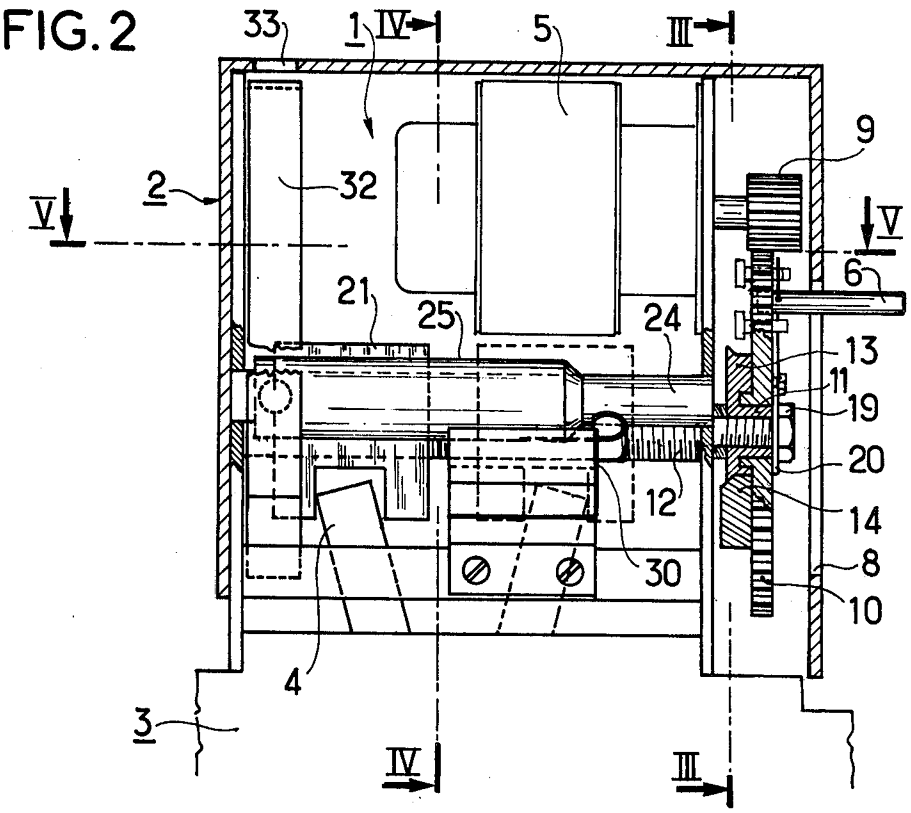
FIG. 2 is an elevation in partial section of the electrical control device.

In FIG. 1 a control device 1 has a hood 2 and is mounted on the top of a circuit-breaker 3. The control device 1 is intended to move an operating member 4 of the circuit breaker 3. The control device 1 is actuated by an electric motor 5 the starting and stopping of which are remote-controlled. In the case of a malfunction of the motor 5, or for any other reason, a folding handle 6 enables the motor to be turned manually. To have access to the handle 6, a mobile shutter 7 on the hood 2 is lifted, thus exposing a hole 8 in the hood 2 enabling the handle 6 to rotate when the hood 2 is in position over the control device 1.

The internal machanism of the control device will be further described in detail below with reference to FIGS. 2 to 5.

The electric motor 5 is operable to cause a drive gear 9 to rotate, this drive gear meshing with a driven gear 10. The driven gear 10 is an idler gear which is simply installed concentrically with the axis of a worm screw 12. A triggering type torque regulator and limiter device is installed between the driven gear 10 and the worm screw 12. The torque limiter includes an eccentric cam 13 rotating with the worm screw 12, the cam being driven by a drive member 14 in the form of a segment of a ring applied against the cam by means of two springs 15 and 16 the fixed ends 18 of which are integral with the driven gear 10. The drive member 14 can be a metallic elbow pin. Advantageously, the drive member 14 is a part made of moulded material having a low friction coefficient.

The driven gear 10 is installed so as to rotate freely about a central portion 11 of the eccentric cam 13. The central portion 11 is screwed to the end of the worm screw 12 and is blocked by a nut 19 and a washer 20.

Figure 4:
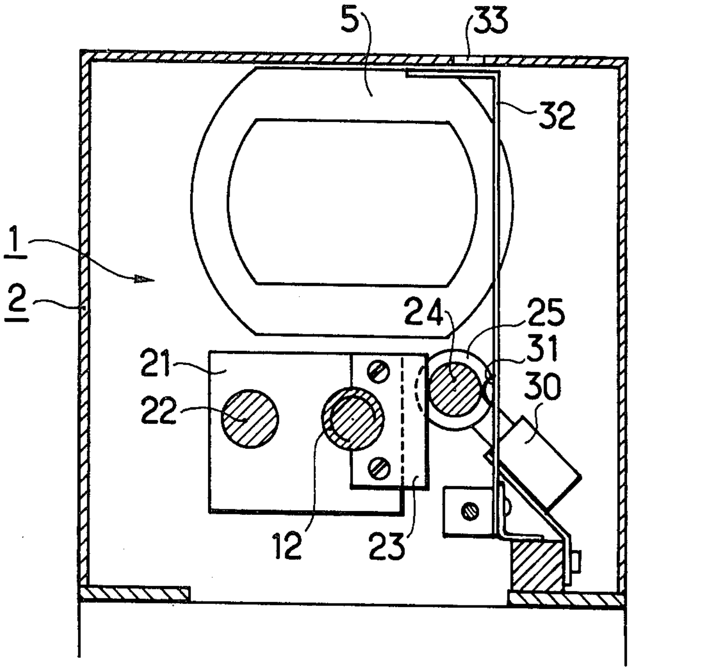
FIG. 4 is a cross-sectional view, taken along the line IV—IV in FIG. 2, of the electrical control device.
Figure 5:
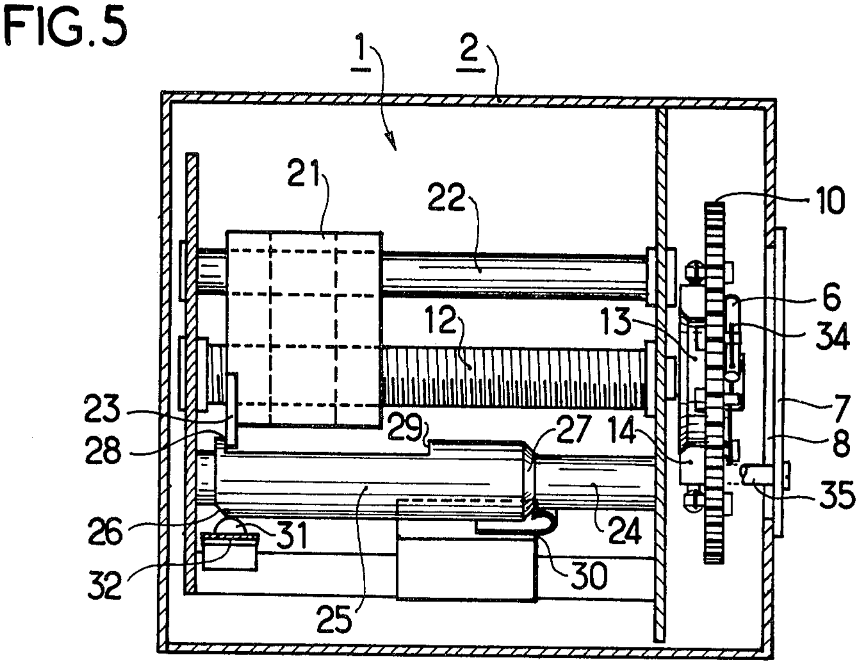
FIG. 5 is a cross-sectional view, taken along the line V—V in FIG. 2, of the electrical control device.

The worm screw 12 moves a nut unit 21 which is guided laterally by a guide rod 22 parallel to the worm screw 12, as most clearly shown in FIGS. 4 and 5. The nut unit 21 is in the shape of a U, the arms of which embrace the operating member 4 of the circuit breaker 3, thus enabling the switching of the operating member 4 from the closed position to the open position or vice-versa according to the direction of rotation of the motor 5. A tab 23, the function of which will be explained in detail hereinafter is fixed on the nut unit 21 at one of its ends.

A rod 24 is disposed parallel to the worm screw 12 and has a slidable member 25 associated therewith. The member 25 is substantially cylindrical in shape with one end 26 being wedge-shaped and the other end 27 being frusto-conical in shape. Moreover, the slidable member 25 has a notch adjacent to the nut unit 21 defining two stops 28 and 29. The tab 23 of the nut unit 21, when caused to move along the worm screw 12, also moves the slidable member 25 by means of the stops 28 and 29. Hence, the movement of the slidable member 25 is effected only in end positions of the nut unit 21. An end-of-stroke reversible switch 30 is actuated at the end of stroke of the movement of the slidable member 25 when a control lever of the reversible switch 30 slides along the frusto-conical end portion 27 of the slidable member 25. In this latter position, corresponding to the closing of the operating member 4 of the circuit-breaker 3, the end-of-stroke reversible switch 30 cuts out the electrical supply to the motor 5. At the same time, the wedge-shaped end portion 26 of the slidable member 25 engages a stud 31, caused a blade 32 acting as a mechanical indicator member to be dispatched. The blade 32 terminates in an L-shaped shoulder which bears two colored strips, one red and one green, appearing alternately in front of a window 33 of the hood 2 and indicating that the circuit-breaker 3 is either open or closed. The engaging of the end-of-stroke reversible switch 30 and of the blade 32 take place simultaneously.

In the case where the user wishes to control the opening or closing of the circuit-breaker in situ, the folding handle 6 makes it possible to turn the motor 6 by hand.

The handle 6 is disposed on the driven gear 10. The result of this is that the torque limiter assembly remains active even when the device is actuated by the handle. The latter is kept folded by means of a spring 34, disposed on the outside face of the driven gear 10 supporting the handle.

Figure 6:
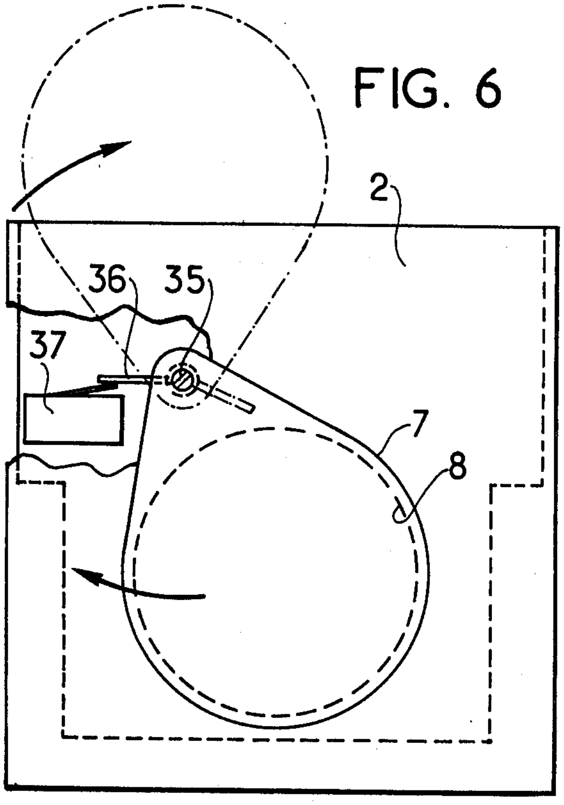
FIG. 6 is a profile in partial section of the electrical control device on its cover side with its hood partially cut away.
Figure 7:
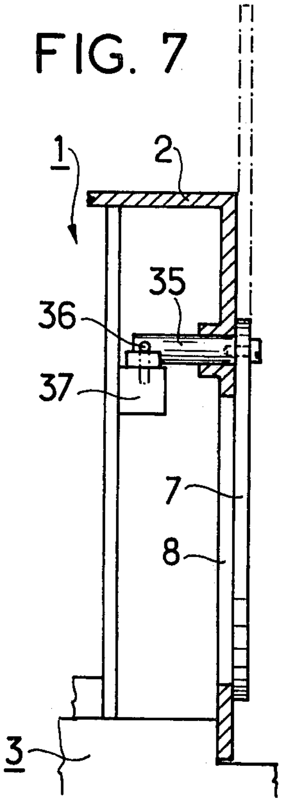
FIG. 7 is a partial vertical cross-sectional view of the electrical control device as shown in FIG. 6.

FIGS. 6 and 7 show how it is possible to have access to the handle 6 and to rotate it. An axle 35 of the mobile shutter 7 is integral with a rod 36 bearing, in its closed position, on a safety catch 37 disposed in the electrical supply circuit of the motor 5. When the shutter 7 is raised, the rod 36 no longer bears on the safety catch 37, in which case the motor is no longer supplied with current. The same applies if the hood 2 is removed.

Figure 8:
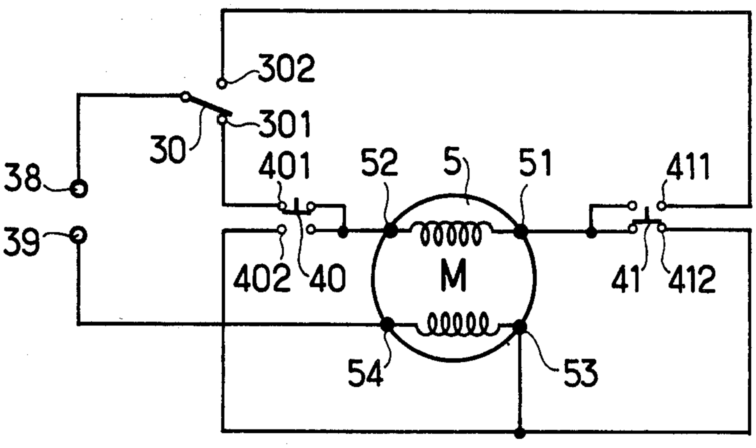
FIG. 8 is a partial circuit diagram of an electrical supply circuit for the motor.

FIG. 8 shows the electrical operation diagram of the device. In this figure, the safety catch 37 is not shown. This figure shows a pair of output terminals 38 and 39, the end-of-stroke reversible switch 30 in a position 301 corresponding to the open circuit-breaker, the motor 5 with its armature connections 51 and 52 and inductor connections 53 and 54, a button 40 for controlling the opening of the circuit-breaker and a button 41 for controlling the closing of the circuit-breaker. Both buttons 40 and 41 are push-buttons which are not self-supplied. When the push-buttons 40 and 41 are pressed, they change respectively from the positions 401 and 411 to 402 and 412, respectively, and they rise again as soon as the pressure of the finger has been released.

The operation of the circuit is as follows:

the circuit-breaker 3 is open, the end-of-stroke reversible switch 30 is in the position 301. The push-button 40 is not pressed down and is in the rest position 401. The push-button 41 is pressed down in order to close the circuit-breaker 3. Current flows through the armature from 52 towards 51 and through the inductor from 53 towards 54. The motor 5 rotates in a direction which moves the circuit-breaker operating member 4 towards the closed position. At the end of the closing stroke, the end-of-stroke reversible switch 30 changes to the position 302 and the motor 5 is no longer supplied with current. The user can then release the push-button 41.

When it is required to open the circuit-breaker 3, the various positions of the components are as follows:

The circuit-breaker 3 is closed. The end-of-stroke reversible switch 30 is in the position 302. The push-button 41 is in the rest position 411. The push-button 40 is then pressed down to the position 402. Current flows through the armature from 51 towards 52 and through the inductor from 53 towards 54. The current in the armature being reversed in relation to the previous case and being the same in the inductor, the motor 5 rotates in the reverse direction in relation to that for closing the circuit-breaker 3. At the end of the opening stroke, the reversible switch 30 changes positions again and returns to 301. The motor 5 is no longer supplied with current and the push-button 40 can be released.

The control device for the electrical equipment makes it possible, mainly due to the torque limiter which acts, when the operating member 4 at the time when the motor 5 is stopped, either as an opening means or as a closing means, to eliminate sudden jerks and to dissipate the excess kinetic energy of the motor 5 in the torque limiter. The device also has a torque regulating action, more particularly, at the time of the starting up of the motor 5. Indeed, the various parts of the device, including the drive member 14 and the springs, 15 and 16 progressively take up, in relation to the driven gear 10 and to the eccentric cam 13 between which they are connected, a position corresponding to the opposing torque exerted by the worm screw 12. Therefore, no sudden jerks are transmitted to the motor 5 and this considerably increases the service life and the reliability of the control device while enabling a light and economical structure of all the driven members.

Figure 3:
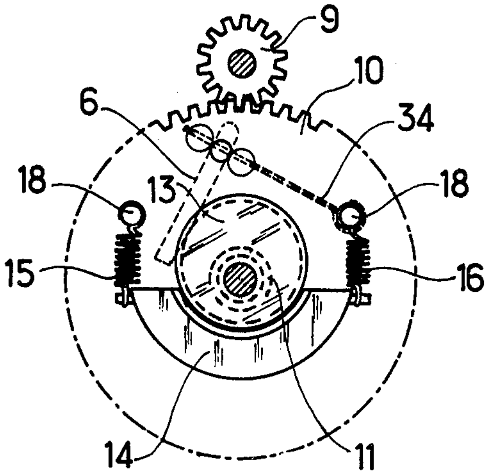
FIG. 3 is a cross-sectional view, taken along the line III—III in FIG. 2, of the electrical control device, the hood of the electrical control device being removed.

On referring more particularly to FIG. 3, the position of the parts correspond to a stable balance in which the tension of the springs 15 and 16 is minimum and the torque exerted by the drive member 14 on the eccentric cam 13 is zero, the resultant of the forces passing through the axis of rotation.

If, starting from this position, the driven gear 10 is made to rotate, the anchoring point 18 of the springs 15 and 16 also rotate and the movement is transmitted to the drive member 14 with a delay angle depending on the fractional forces of the drive member 14 on the eccentric cam 13. The springs 15 and 16 therefore stretch progressively as the drive member 14 rotates about the eccentric cam 13. Simultaneously, the direction of the resultant force exerted on the cam 13 varies and the motor torque applied to the cam increases progressively. When this motor torque reaches the value of the opposing torque, the eccentric cam 13 then starts rotating, driving the worm screw 12 at the same speed as the driven gear 10, as if they were integrally interconnected.

Now, if the drive member 14 the nut unit 21 is stopped and prevents the rotating movement of the worm screw 12 and of the cam 13. Simultaneously, the end-of-stroke reversible switch 30 cuts out the electrical supply to the motor 5. But the motor 5 and the driven gear 10 can nevertheless continue to rotate under the effect of their momentum. Indeed, the opposing torque is transmitted to the driven gear 10 by means of the torque limiter. With the accentric cam 13 being blocked, the driven gear 10 and the drive member 14 continuing to rotate, the opposing torque exerted on the driven gear 10 continues to increase, passes through a maximum and then decreases and cancels out (neglecting the friction when the drive member 14 reaches a diametrically opposite position in relation to the eccentric cam 13 to that in FIG. 3). In this position, the system is unstable and tends to return spontaneously to the stable balanced position which is that shown in FIG. 3. The driven gear 10 and the motor 5 thus continue to rotate, dissipating the whole of their kinetic energy without the forces applied exceeding the maximum value allowed by the torque limiter.

Of course, the power of the motor 5, the reduction ratio between the gears 9 and 10, the pitch of the worm screw 12, the profile of the eccentric cam 13 and the tension of the springs 15 and 16 are calculated as a function of the force necessary for completely reliable actuation of the operating member 4 of the circuit-breaker 3. Moreover, it is an advantage to make the friction between the worm screw 12 and the nut unit 21 as little as possible; this can be effected by known means such as square-threaded screws or ball nuts.

It is also an advantage to limit the friction between the drive member 14 and the accentric cam 13; this can be effected by using pairs of materials having a low friction coefficient or even by using as a cam, a ball bearing installed accentrically if the effects of friction are to be almost completely eliminated.

The drive member 14 and the springs 15 and 16 can be replaced by a leaf spring bearing on the accentric cam 13 and on studs integral with the driven gear 10. It is also possible, by way of another example, to use a handle installed at the end of the worm screw 12 on an axle crossing through the driven gear 10 with the end of the handle being connected by a spring to a stud integral with the driven gear 10.

Figure 9:
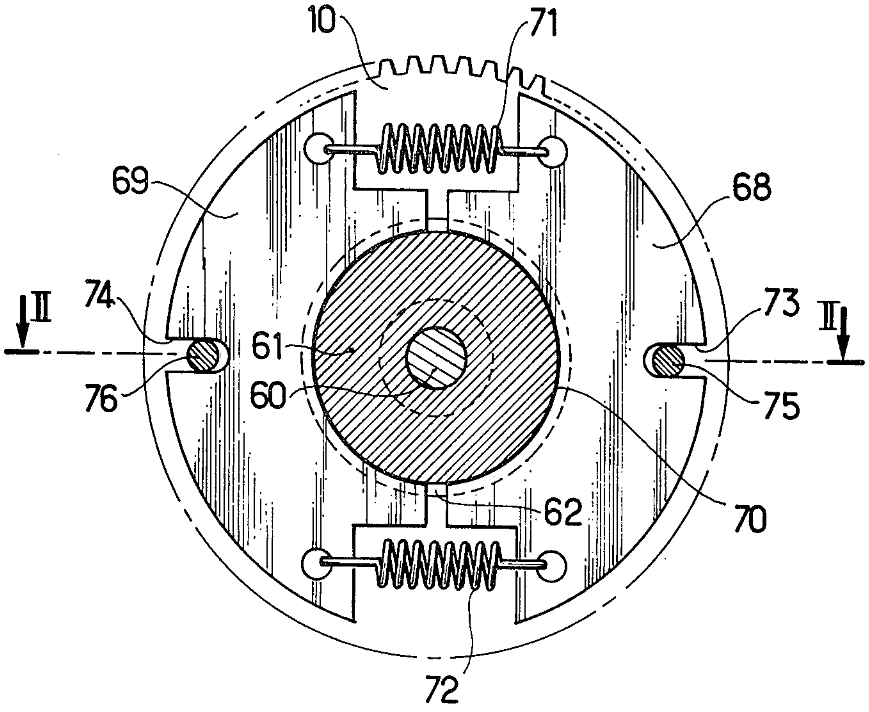
FIG. 9 is a schematic elevation along line I—I in FIG. 10 of the torque limiter device arranged between the drive mechanism and the movement transmission mechanism of an electrical control device according to the invention.
Figure 10:
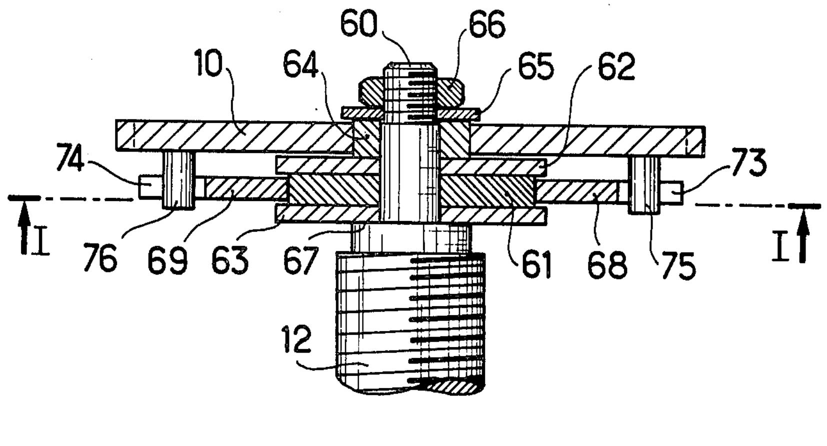
FIG. 10 is a cross-sectional view, taken along the axis II—II, of the torque limiter device shown in FIG. 9.

A second embodiment for the torque limiter is shown in FIGS. 9 and 10. A disc 61 made of rough material is installed between two flat washers 62 and 63 having diameter which is slightly greater than that of the disc 61. The disc 61 is blocked on the axle 60 of the worm screw 12 of the movement transformation mechanism. A ring 64 is also installed on the axle 60 and supports a driven gear 10 installed so as to rotate freely about the ring 64. The fixing on the axle 60 is ensured by a washer 65 and a nut 66 screwed on the threaded end of the axle 60 and retaining the above described assembly against a shoulder 67 of the axle 60.

Two metallic parts 68 and 69 in the form of a segment of a ring, the smallest radius of which is equal to that of the disc 61, surround the disc 61. Their thickness is slightly less than that of the disc 61 and are kept bearing against the latter along the cylindrical surface 70 between the two washers 62 and 63 by means of two springs 71 and 72 stretched between the two members 68 and 69. The members 68 and 69 comprises respective ports 73 and 74, in which are engaged with slight play respective lugs 75 and 76 integral with the driven gear 10.

The operation of the device is as follows. The springs 71 and 72 clamp the two members 68 and 69 against the disc 61 of rough material with a force F when the device is stopped abutting in the open position or closed position. When the device starts moving, the driven gear 10 progressively reaches an increasing speed and drives, in its rotational movement, the members 68 and 69 by means of the lugs 75 and 76; the movement is thus transmitted to the disc 61 which drives the worm screw 12. As the speed increases, the centrifugal force $f$ which is exerted on the members 68 and 69 increases also and is subtracted from the force F exerted by the springs 71 and 72.

The friction force which is exerted between the parts 68 and 69 and the disc 61 is thus at its maximum when the device is idle and decreases progressively until the device has reached its maximum speed.

When the device abuts in the open position or closed position, the worm screw 12 and the disc 61 are stopped, but the members 68 and 69 and the drive gear 10 can continue to rotate under the effect of their momentum with all the drive mechanism, with a low friction force between the disc 61 and the members 68 and 69. All the kinetic energy acquired by the drive mechanism is thus dissipated in friction in the torque limiter until the device comes to a complete standstill, exerting on the disc 61 only a slight torque when it abuts.

Obviously, other forms of torque limiters having a friction connection other than the ones which have previously been described can be produced without going beyond the scope of the invention.

What is claimed is:

1. An electric motor-control device for electrical equipment having drive means including: electric motor means connected through a torque limiter for driving a movement transformation mechanism provided with a worm screw; a nut unit mounted on said worm screw and movable along said worm screw, said nut unit being connectable to an operating member of the electrical equipment to be controlled; said torque limiter being defined by an elastic connection between two rotating members, one connected to said drive means and the other to said movement transformation mechanism; and an accentric cam; said cam rotating with said worm screw and a drive member bearing against said cam, said cam being spring-mounted on a driven gear of said drive means, whereby said gear rotates freely about an axis common to said cam and said worm screw.

2. A motor-control device for electrical equipment according to claim 1, wherein: said torque limiter comprises a friction connection between two rotating assemblies, one connected to said drive means and the other connected to said movement transformation mechanism, said friction connection exerting a frictional force between said assemblies decreasing as a function of the angular speed of said assembly connected to said drive means.

3. An electric motor-control device for electrical equipment, according to claim 2, wherein: said torque limiter comprises a disc formed of a rough material rotatable with said worm screw and clamp means defined by a segment of a ring connected together by springs for clamping said disc and rotating with a gear of said drive means.

4. An electric motor-control device for electrical equipment according to claim 3, wherein: said clamp means being provided with port means for engagement with a lug intergral with said gear of the drive mechanism.

* * * * *